(12) United States Patent
Geske (10) Patent No.: US 10,523,017 B2
(45) Date of Patent: Dec. 31, 2019

(54) SWITCH MODULE AND CONVERTER WITH AT LEAST ONE SWITCH MODULE

(71) Applicant: GE Energy Power Conversion Technology Ltd, Rugby, Warwickshire (GB)

(72) Inventor: Martin Geske, Berlin (DE)

(73) Assignee: GE ENERGY POWER CONVERSION TECHNOLOGY LTD., Warwickshire (GB)

( * ) Notice: Subject to any disclaimer, the term of this patent is extended or adjusted under 35 U.S.C. 154(b) by 102 days.

(21) Appl. No.: 15/095,283

(22) Filed: Apr. 11, 2016

(65) Prior Publication Data

US 2016/0308373 A1 Oct. 20, 2016

(30) Foreign Application Priority Data

Apr. 17, 2015 (DE) .......................... 10 2015 105 889

(51) Int. Cl.
  *H02M 1/00* (2006.01)
  *H02J 5/00* (2016.01)
  *H02M 7/483* (2007.01)

(52) U.S. Cl.
  CPC ............... *H02J 5/00* (2013.01); *H02M 1/00* (2013.01); *H02M 7/483* (2013.01); *H02M 2007/4835* (2013.01)

(58) Field of Classification Search
  CPC ................. H02M 1/00; H02M 7/483; H02M 2007/4835; H02J 5/00
  See application file for complete search history.

(56) References Cited

U.S. PATENT DOCUMENTS 7,269,037 B2 9/2007 Marquardt
7,944,091 B2 * 5/2011 Zacharias ............... H02M 7/48
                                                          307/112

(Continued)

FOREIGN PATENT DOCUMENTS

CN    103872931 A    6/2014
DE    10103031 A1    7/2002

(Continued)

OTHER PUBLICATIONS

Unofficial English Translation of Germany Office Action issued in connection with corresponding DE Application No. 102015105889.8 dated Nov. 16, 2015.

(Continued)

*Primary Examiner* — Pinping Sun
(74) *Attorney, Agent, or Firm* — Wood IP LLC (57) ABSTRACT

A switch module and a converter developed with the help of a switch module. The switch module presents two series connections comprising a power semi-conductor switch and a diode and. Parallel to the first series connection a first capacitor is connected. Between the first capacitor and the second series connection at least one intermediate connection is connected. This is designed as quadripole, whereby between both the output connections a second capacitor is connected. The first output connection is connected through a third power semi-conductor switch with the first input connection. The second output connection is connected with the cathode of a third diode, whose anode is connected with the second input connection of the intermediate circuit. With this switch module at least five voltage levels can be set up for an output voltage. For each additionally present intermediate circuit the number of the possible voltage levels increases by two.

9 Claims, 4 Drawing Sheets

(56) References Cited

U.S. PATENT DOCUMENTS

| | | | | |
|---|---|---|---|---|
| 8,471,604 | B2* | 6/2013 | Permuy | H03K 17/10 327/108 |
| 9,071,165 | B2* | 6/2015 | Soua | H02M 7/487 |
| 9,178,443 | B2 | 11/2015 | Janning | |
| 9,312,705 | B2* | 4/2016 | Permuy | H02J 7/0014 |
| 9,590,489 | B2* | 3/2017 | Jung | H02M 7/483 |
| 9,705,406 | B2* | 7/2017 | Bakran | H02M 3/156 |
| 9,748,848 | B2* | 8/2017 | Bakran | H02M 3/33584 |
| 9,929,634 | B2* | 3/2018 | Nami | H02M 7/483 |
| 2005/0083716 | A1* | 4/2005 | Marquardt | H02M 5/271 363/132 |
| 2010/0259955 | A1* | 10/2010 | Shimada | H02M 7/219 363/49 |
| 2012/0063185 | A1* | 3/2012 | Janning | H02M 7/219 363/126 |
| 2012/0243282 | A1 | 9/2012 | Marquardt | |
| 2013/0107595 | A1* | 5/2013 | Gautier | H02P 27/085 363/124 |
| 2014/0167508 | A1* | 6/2014 | Schramm | H02M 3/07 307/31 |
| 2014/0226373 | A1* | 8/2014 | Park | H02M 1/12 363/35 |
| 2014/0347904 | A1* | 11/2014 | Kinoshita | H02M 7/217 363/126 |

FOREIGN PATENT DOCUMENTS

| | | |
|---|---|---|
| DE | 10217889 A1 | 11/2003 |
| DE | 102010046142 A1 | 3/2012 |
| DE | 102011086087 A1 | 5/2013 |
| EP | 1497911 B1 | 10/2005 |

OTHER PUBLICATIONS

Unofficial English Translation of German Office Action issued in connection with corresponding DE Application No. 102015105889.8 dated Nov. 11, 2015.

Unofficial English Translation of German Office Action issued in connection with corresponding DE Application No. 102015105889.8 dated Apr. 6, 2016.

* cited by examiner

Fig. 6

SWITCH MODULE AND CONVERTER WITH AT LEAST ONE SWITCH MODULE

BACKGROUND

Embodiments of the present invention relate to a switch module for a converter and a converter with one switch module. Such switch modules are applied in the converters so as to convert an alternating current or alternating voltage in to several voltage values in an output voltage. For this purpose, the switch module presents several power semi-conductor switches and an intermediate circuit with a capacitor. With the help of such switch module a converter can be developed. The converter can be used as rectifier and/or alternating current-converter and generally as power converter respectively.

Such a switch module and a converter comprising several switch modules are well known from DE 10 2010 046142 A1. The switch module presents two power semi-conductor switches, with which a diode is connected in series. Parallel to both the series connections a capacitor is arranged. Depending on the switching conditions of both the power semi-conductor switches the current flow can be used for charging the capacitor and/or discharging the capacitor. Thereby, an output voltage is generated at an output of the switch module is created, which is either equal to null, if the capacitor is not in the current-conducting path, it is greater than null if the capacitor was charged through a current in a first direction, or is smaller than null if the capacitor was charged through a current in an reverse second direction.

US 2012/0243282 A1 discloses a converter for high voltages. This module type and/or the partial converter is equipped for a bidirectional current flow. It presents a series connection from two power semi-conductor switches, a series switch comprising two diodes arranged parallel to it and a capacitor parallel to it. The central point of both the series connections is connected with a common converter connection. The described arrangement is provided both in an input circuit and also in an output circuit. The input circuit and the output circuit are linked with each other through a connection circuit. Through the connection circuit, the capacitor of the input circuit is connected to both the input connections through the series connection from a diode and a resistance with the assigned capacitor connection for the capacitor of the output circuit. The connection circuit presents another diode and parallel to it a power semi-conductor in a switch-branch. The diode in the switch-branch is arranged in such a way that its conducting direction conforms to the conducting direction of the other diode of the connection circuit. The arrangement as a whole presents five power semi-conductor switches and seven diodes. With this arrangement, it is possible to adjust five different voltage values between both the connections. The expenditure for the switching and the component is comparatively large.

A similar arrangement is known from EP 1497911 B1. There, in the connection circuit, instead of the series connection from the diode and the resistance, a parallel connection of a power semi-conductor switch and a diode is provided, whereby the switch-branch is dispensed with. This arrangement requires six power semi-conductor switches and six diodes.

Based on the state of the art, it can also be viewed as the object of the present invention to create a simplified switch module for use in a converter. This objective is solved through a switch module and a converter with the features given in embodiments of the present invention.

SUMMARY OF THE INVENTION

The switch module has a first module connection and a second module connection. Between both the module connections an output voltage of the switch module can be present. The switch module in an implementation without free-wheeling diodes is designed parallel to the power semi-conductor switches. The switch module is equipped for the unidirectional operation. An input current flows into the first module connection, through the switch module and comes out at the second module connection from the second module. The operation with current in reverse direction is not provided.

With the usage of free-wheeling diodes parallel to the controllable power semi-conductor components the feeding of current in reverse direction for a voltage level is possible.

The switch module has a first series connection comprising a controllable first power semi-conductor switch and a first diode between a first and a second connection node. The anode of the first diode is connected with the power semi-conductor and the cathode is connected with a first connection node and more particularly directly connected. The first power semi-conductor switch is connected with the second connection node, more particularly directly connected. A first capacitor is connected parallel to the first series connection.

Besides, the switch module presents a second series connection between a third and a fourth connection node, which is developed corresponding to the first series connection. The second series connection has a second power semi-conductor switch and a second diode arranged to it in series, whose cathode is connected with the second semi-conductor switch and to the second module connection and its anode is connected with the third connection node, more particularly directly connected.

Apart from this, at least one intermediate circuit is present with a first input connection, a second input connection, a first output connection and a second output connection, which presents a second capacitor, a controllable third power semi-conductor switch and a third diode.

The third power semi-conductor switch is connected between the first input connection and the first output connection and more particularly directly connected with the concerned connection. The second capacitor is connected parallel to both the output connections and preferably directly with both the output connections. The anode of the third diode is connected, more particularly directly with the second input connection.

The first input connection is connected with the first connection node, the second input connection with the second connection node, the first output connection with the third connection node and the second output connect with the fourth connection node.

The switch module in accordance with embodiments of the present invention can generate an output voltage with minimum five voltage values between the module connections, if a single intermediate circuit is present. Depending on the switching conditions of the power semi-conductor switch the output voltage can be equal to the voltage value of either of the capacitors or the sum of both the capacitor-voltages or can be null.

If multiple intermediate circuits are connected in series, for each additional intermediate circuits, two other voltage levels of the output voltage are created. Thereby number of possible output voltage levels can be increased.

Even though the switch module is in a position to prepare at least five different voltage levels, it manages with a lesser number of power semi-conductor switches and diodes. More particularly, with the designing of an intermediate circuit only the three power semi-conductor switches and only the three diodes connected in series between the two power semi-conductors switches are present. The number of components is small, as a result the required construction space is also small. With another embodiment, additional freewheeling diodes can be present at the power semi-conductor switches. These can be optionally present in order to enable reverse current flow or can be used for increasing the blocking capability of the controllable semi-conductor switches.

As power semi-conductor switches, controllable semi-conductor components are used. More particularly, for each power semi-conductor switch one controllable semi-conductor element is present. In an embodiment, the so-called IGBT ("Insulated-Gate-Bipolar Transistor") is used. Further, the usage of n-Channel-IGBTs is desirable, which conduct normally.

Alternatively, the IGBTs can also use semi-conductor switches like GTO-thyristors ("Gate-Turn-Off-Thyristor"), other types of thyristors, field-effect transistors, especially MOSFETS or other suitable semi-conductor power switches.

The dielectric strength and the blocking capability of the third power semi-conductor may be greater and is at least double that of the dielectric current and/or the blocking capability of the first and the second power semi-conductor switch.

It is preferred, when both the capacitors of the switch module are identical or present at least identical capacities.

With the help of the switch module in accordance with an embodiment of the present invention described previously, a converter can be developed. A converter presents at least one switch module arrangement. The switch module arrangement is arranged between a first direct voltage connection and a second direct voltage connection. Between the direct voltage connections a converter direct voltage is present. For each electrical alternating current phase of the external unit, to which the converter is to be connected, the switch module arrangement presents a phase connection. For instance, if the converter has to be connected to a three-phase unit, for example, a three-phase electrical machine or three-phase power system, then three phase connections are correspondingly present.

The switch module arrangement has at least one module series connection. With each of the available phase connection a separate module series switch is connection is connected. Each module series connection has a middle connection, which may be connected directly with the assigned phase connection.

Besides, each module series connection has at least two switch modules in accordance with embodiments of the present invention, which are arranged in series to each other in the module series connection.

In each module series connection, a first switch module and a last switch module are present. The first switch module with its first module connection is connected with the second direct voltage connection of the converter and the last switch module with its second module connection is connected with the first direct voltage connection of the converter. The first switch module, with its second module connection is directly or indirectly, through at least one intermediate switch module, connected with the first module connection of the last switch module. If at least one intermediate switch module is present, its first module connection is connected with the second module connection of the adjacent switch module and its second module connection to the first connection of the other adjacent switch module. In this manner, the module series connection is developed in such a way that the output voltages of each switch module add to the entire voltage between the direct voltage connections.

The capacitors of the switch modules serially connected in a module series connection can receive power in at least one switching status of the power semi-conductor switch and emit power in at least in another switching status of the power semi-conductor. Thereby, it is possible to adjust the output voltages abutting the switch modules of the series module connection in such a way that impermissible deviations of the respective output voltage can be avoided.

In an embodiment, the number of the switch modules in a module series connection is even-numbered. The number of the switch module between the middle connection and the first direct voltage connection on the one side and the second direct voltage connection on the other presents the same number of switch modules.

With the conversion of the direct voltage in to an alternating voltage and an alternating voltage into a direct voltage, it can be sufficient if the converter presents a single switch module arrangement. It is possible to provide two switch module arrangements, so that a first alternating voltage can be converted into a second alternating voltage. Thereby, the first direct voltage connections and the second direct voltage connections of both the switch module arrangements are connected directly or indirectly with each other. The connection between both the first direct voltage connections and the second direct voltage connections can be made more particularly through an inductance.

Besides, it is possible that the central tapping with both adjacent switch modules to each module series connection is connected through an inductance.

BRIEF DESCRIPTION OF THE DRAWINGS

Advantageous designs of embodiment of the present invention result from dependent claims, the description and the drawing. In the following, preferred examples of embodiments of the invention are explained in detail with the aid of the attached drawings. The drawings show:

DETAILED DESCRIPTION

Figure 1:
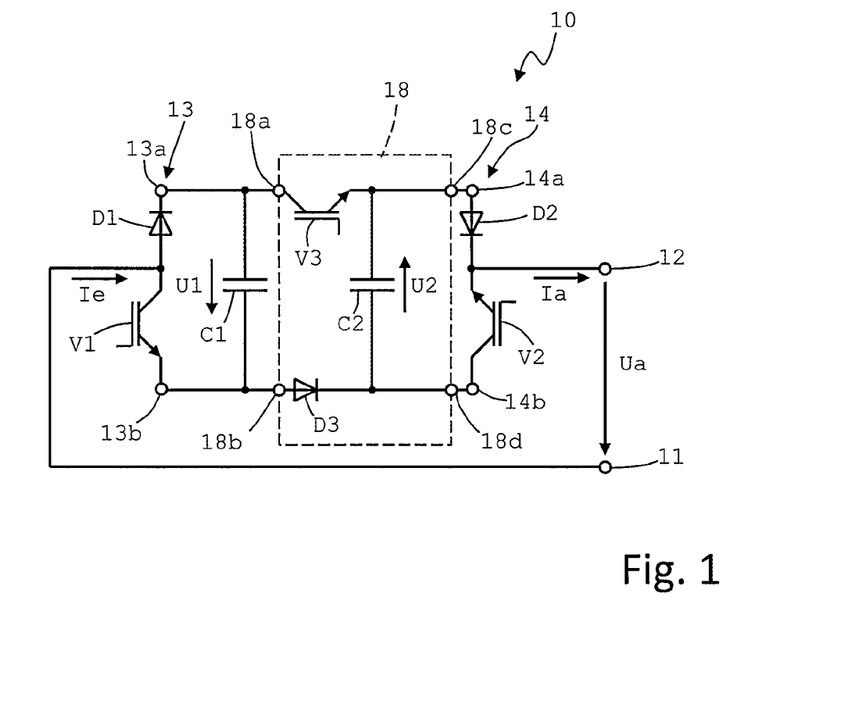
FIG. 1 shows a block diagram of a first embodiment of a switch module.

In FIG. 1 the first embodiment of a switch module 10 is shown. The switch module 10 has a first module connection 11 and a second module connection 12. An output voltage Ua lies between the second module connection 12 and the first module connection 11. Through the first module connection 11 an input current Ie flows into the switch module 10. Through the second module connection 12 an output current Ia flows through the second module connection 12 from the switch module 10.

The switch module 10 has a first series connection 13, which, in the embodiment comprises of a first diode D1 and a first power semi-conductor switch V1. The first series connection 13 is connected between a first connection node 13a and a second connection node 13B. Thereby, the cathode of the first diode is connected with the first connection node 13A. The first power semi-conductor switch V1 is connected between the second connection node 13b and the first module connection 11. The first module connection 11 is connected with the anode of the first diode D1.

A first capacitor C1 of the switch module 10 is connected between the first connection node 13A and the second connection node 13B of the first series connection 13. A first voltage U1 abuts the first connection node 13a and the second connection node 13B at the first capacitor C1.

The switch module 10 has a second series switch 14 from a second diode D2 and a second power semi-conductor V2. The second series connection 14 extends between a third connection node 14A and a fourth connection node 14B. The third connection node 14A is connected with the anode of the second diode D2. The cathode of the second diode is connected with the second module connection 12. The second power semi-conductor V2 is connected between the second module connection 12 and the fourth connection node 14B.

Besides, at least one intermediate circuit 18 is part of the switch module 10. The intermediate circuit 18 has a first input connection 18A, a second input connection 18B, a first output connection 18C and a second output connection 18D. The intermediate circuit 18 is quadripole.

The intermediate circuit 18 presents, in accordance with the example, a second capacitor C2, a third diode D3 and a third power semi-conductor switch V3. The third power semiconductor switch V3 is connected between the first input connection 18A and the first output connection 18C. The anode of the third diode D3 is connected with the second input connection 18B, whereas the cathode of the third diode D3 is connected with the second output connection 18D. Between the first output connection 18C and the second output connection 18D the second capacitor C2 is connected. A second voltage U2 lies between the second output connection 18D and the first output connection 18C at the second capacitor C2.

The power semi-conductor switches V1, V2, V3 of the switch module 10 can assume a conducting or blocking status respectively. By switching the power semi-conductor switches V1, V2, V3 the output voltage Ua can assume five different voltage levels and voltage values respectively. In the following sequence chart different switching sequences of the power semi-conductor switches V1, V2, V3 are specified, whereby a "1" stands for the conducting status and a "0" for the blocking status of a power semi-conductor switch.

| Switch status | V1 | V2 | V3 | Ua |
|---|---|---|---|---|
| 1 | 1 | 1 | 0 | 0 |
| 2 | 0 | 0 | 1 | 0 |
| 3 | 0 | 1 | 0 | −U1 |
| 4 | 1 | 0 | 0 | −U2 |
| 5 | 1 | 0 | 1 | U1 |
| 6 | 0 | 1 | 1 | U2 |
| 7 | 0 | 0 | 0 | −U1 − U2 |
| 8 | 1 | 1 | 1 | U1 + U2 |

As is evident, the output voltage Ua can assume five different voltage levels, namely 0, −U1 and −U2, U1 and U2, −(U1+U2) and (U1+U2) respectively.

In the first switch status the first and the second power semi-conductor switches V1, V2 conduct, whereas the third power semi-conductor switch V3 blocks. The current flows through the first power semi-conductor switch V1, the third diode D3 and the second power semi-conductor switch V2, so that the output voltage Ua is equal to null. The output voltage Ua is likewise null, if only the third power semi-conductor switch V3 is conducting (second switching status), whereby the current flows through the first diode D1, the third power semi-conductor switch V3 and the second diode D2.

A negative voltage potential of the output voltage Ua can be reached through the third or the fourth switching status. In the third switching status only the second power semi-conductor V2 conducts. The current flows through the first diode D1, the first capacitor C1, the third diode D3 and the second power semi-conductor switch V2. The output voltage Ua conforms to the negative sum of the first voltage, that is −U1.

In the fourth switching status, only the first power semi-conductor switch V1 conducts. The current flows through the first semi-conductor switch V1, the third diode D3, the second capacitor C2 and the second diode D2. The output voltage Ua conforms to the negative sum of the second voltage, that is −U2.

In the fifth switching status the first power semi-conductor switch V1 and the third power semi-conductor switch V3 conduct. The current flows through the first power semi-conductor switch V1, the first capacitor C1, the third power semi-conductor switch V3 and the second diode D2. The output voltage Ua conforms to the first voltage U1.

In the sixth switching status, the third power semi-conductor switch V3 and the second power semi-conductor switch V2 conduct, whereas the first power semi-conductor switch V1 blocks. The current flows through the first diode D1, the third power semi-conductor switch V3, the second capacitor C2 and the second power semi-conductor switch V2. The output voltage Ua conforms to the second voltage U2 at the second capacitor C2.

The largest output voltages as per the sum are achieved through the seventh switching status and the eight switching status. In the seventh switching status all the power semi-conductor switches V1, V2, V3 block the current. The current flows through the first diode D1, the first capacitor C1, the third diode D3, the second capacitor C2 and the second diode D2. The sum of the output voltage conforms to the negative value of the sum from the first voltage and the second voltage −(U1+U2).

With the aid of the seventh switching status, it is evident that the dielectric current and the blocking capability of the third power semi-conductor switch V3 must at least conform to the sum of the first voltage U1 and the second voltage U2. The dielectric current and the blocking capability of both other power semi-conductor switches can be smaller, and for instance, about half the sum.

In the eight switching status all the power semi-conductor switches V1, V2, V3 conduct current. The current flows through the first power semi-conductor switch V1, the first capacitor C1, the third power semi-conductor V3, the second capacitor C2 and the second power semi-conductor V2. The output voltage Ua conforms to the sum of the first voltage U1 and the second voltage U2.

With the aid of the eight switching status, it is evident that the dielectric current and blocking capability of the third diode D3 must conform to the sum of the first voltage U1 and the second voltage U2. The dielectric current and the blocking capability of the other two diodes D1, D2 can be chosen smaller, and for instance about half the sum.

With the help of this switch module 10, a conversion between five different voltage levels is achieved with lesser components and, thereby with lesser switching time. The switch module 10 is suitable for usage in converters, for instance, power converters, direct current converters or alternating current converters.

The capacitors C1, C2 can be charged specifically through different voltage statuses, or discharged. Thereby the output voltage Ua is maintained in a desired, predefinable voltage range, so that the adverse large deviations are avoided. If several switch modules 10 are connected in series, so that their output parameters Ua add up, through specific charging and/or discharging of individual capacitors the power can be transferred between the switch modules 10 and thereby the output voltages can be influenced purposefully.

Figure 2:
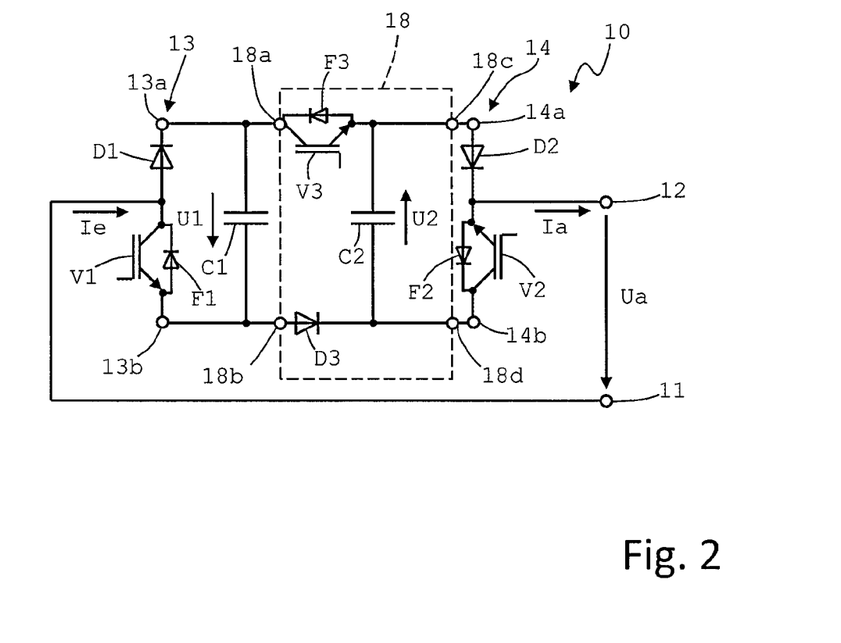
FIG. 2 shows a block diagram of a second embodiment of a switch module.

The embodiment of the switch module 10 in FIG. 2 conforms to the embodiment from FIG. 1. Additionally, for each power semi-conductors free-wheeling diodes F1, F2, F3 are allocated. The free-wheeling diodes F1, F2, F3 can increase the blocking capability of the controllable power semi-conductors or can enable a switching status with reverse current flow. Otherwise, the design and the functioning conforms to the embodiment in accordance with FIG. 2 of the embodiment explained above in accordance with FIG. 1, so once can refer to the previous description.

As shown in FIG. 1, the first input connection 18A is connected with the first connection node 13A, the first output connection 18C with the third connection node 14A, the second input connection 18B with the second connection node 13B and the second output connection 18D with the fourth connection node 14B. Between the four connecting nodes 13A, 13B, 14A, 14B several intermediate circuit switches 18 can also be connected in series With the embodiments, the power semi-conductor switches V1, V2, V3 are given as semi-conductor switches. Especially, as power semi-conductor switches the IGBTs are used. Alternatively, the field-effect transistors or thyristors could be used.

Figure 3:
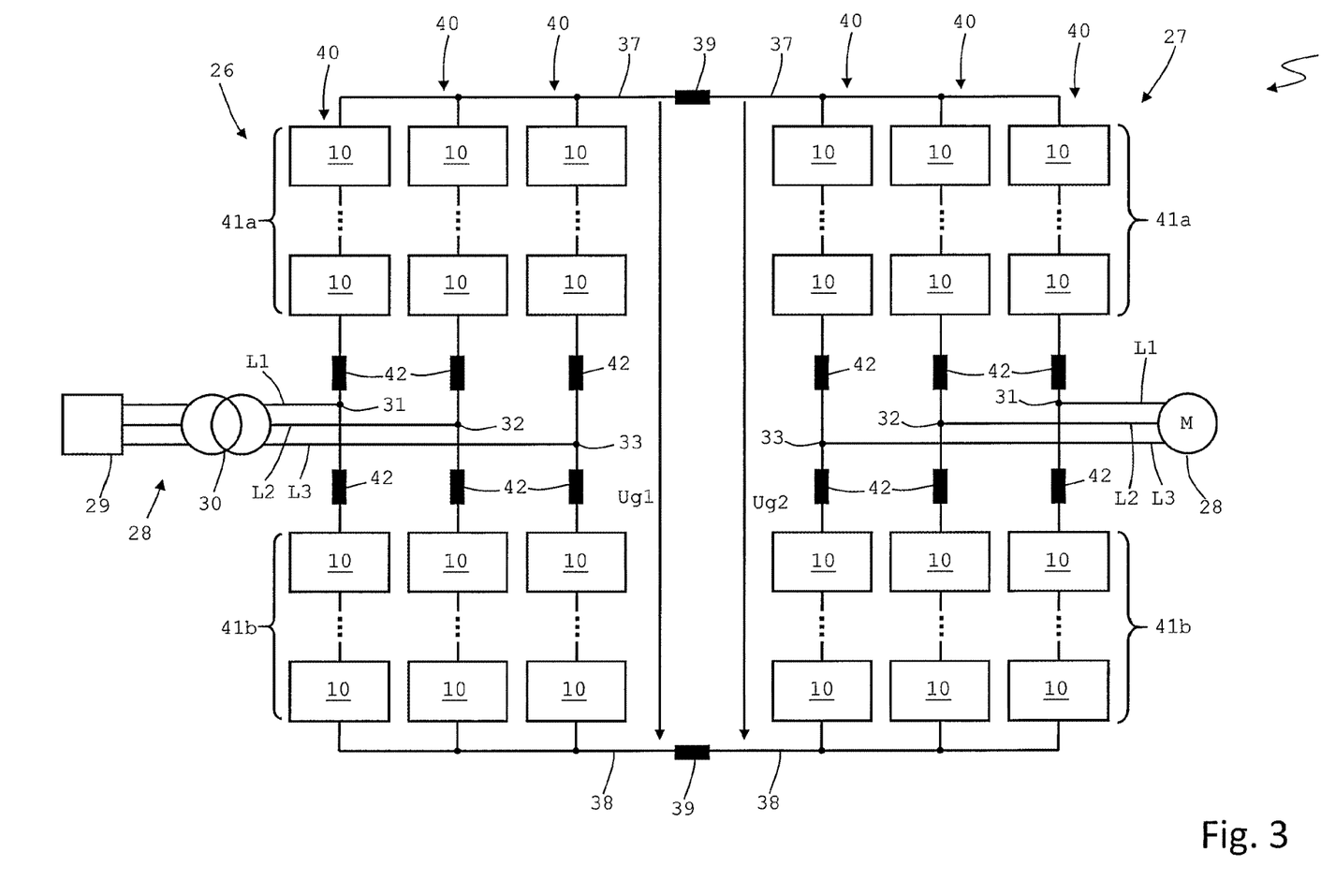
FIG. 3 shows a block diagram of a first embodiment of a converter with two switch module arrangements and FIG. 4 shows a block diagram of a second embodiment of a converter with at least one switch module arrangement.

With the help of several aforementioned switch module arrangements 10, a converter 25 can be developed. An example for a converter 25 is shown in FIG. 3. The converter 25 presents a first switch module arrangement 26 and with the embodiment it presents additionally a second switch module arrangement 27. The converter 25 is installed to be connected both at the input side and also the output side of an external unit with several and, for example, 3-phases L1, L2 and L3. As external unit, at the input side, e.g., a power supply network 29 with the transformer 30 is connected to the first switch module arrangement 26. At the output side, to the second switch module arrangement 27 an electrical machine M is connected as external unit 28. With the electrical machine M, it can relate to a motor and/or a generator.

For each electrical phase L1, L2, L3 the allocated switch module arrangement 26, 27 presents a phase-connection and, for instance, for the three phases L1, L2 and L3 a first phase connection 31 for the first phase L1, a second phase connection 32 for the second phase L2 and a third phase connection 33 for the third phase L3.

Besides, the switch module arrangement 26 and 27 present a first direct voltage connection 37 and a second direction voltage connection 38, between which converter direct voltage Ug1 and Ug2 is present. In an embodiment, both the first direct voltage connections 37 and both the second voltage connections 38 are connected with each other through an allocated first inductance 39.

Each switch module arrangement 26, 27 presents a module series connection 40 for each electrical phase the Phase L1, L2, L3 that are to be connected. Each module series connection 40 comprises two sub-sections 41A, 41B, namely a first sub-section 41A and a second subsection 41B, with at least one switch module 10. To each phase connection 31, 32, 33 a first subsection 41A and a second subsection 4 of a Bmodule series connection 40 is connected respectively. The connection is made in the embodiment through a second inductance 42. The first sub-section 41A is connected two second inductances 42 with the second sub-section 41B of the module series connection 40.

Each sub-section 41A, 41B of a module series connection 40 presents a switch module 10 or several switch modules 10 connected in series. The first sub-section 41A connects the concerned phase connection 31, 32, 33 through the second inductance 42 with the first direct current connection 37, whereas the second sub-section 41b connects the concerned phase connection 31, 32, 33 through respective second inductance 42 with second direct current voltage 38. The number of switch modules 10 in both the sub-sections 41A, 41B of a module series connection 40 may be equal. Thus, each module series connection 40 has an even number of switch modules 10.

The number of switch module 10 per sub-section 41A, 41B determines the number of voltage levels, in which the first converter direct voltage Ug1 and/or the second converter direct voltage Ug2 respectively abutting between both the direct voltage connections 37, 38 can be apportioned.

With the converter 25 as per FIG. 3, two switch module arrangements 26, 27 are present. Thereby, the first converter direct voltage Ug1 is converted again through the second converter direct voltage Ug2 into multi-phase alternating voltage for the electrical machine M.

Alternatively, only one switch module arrangement 26 can be present.

Figure 4:
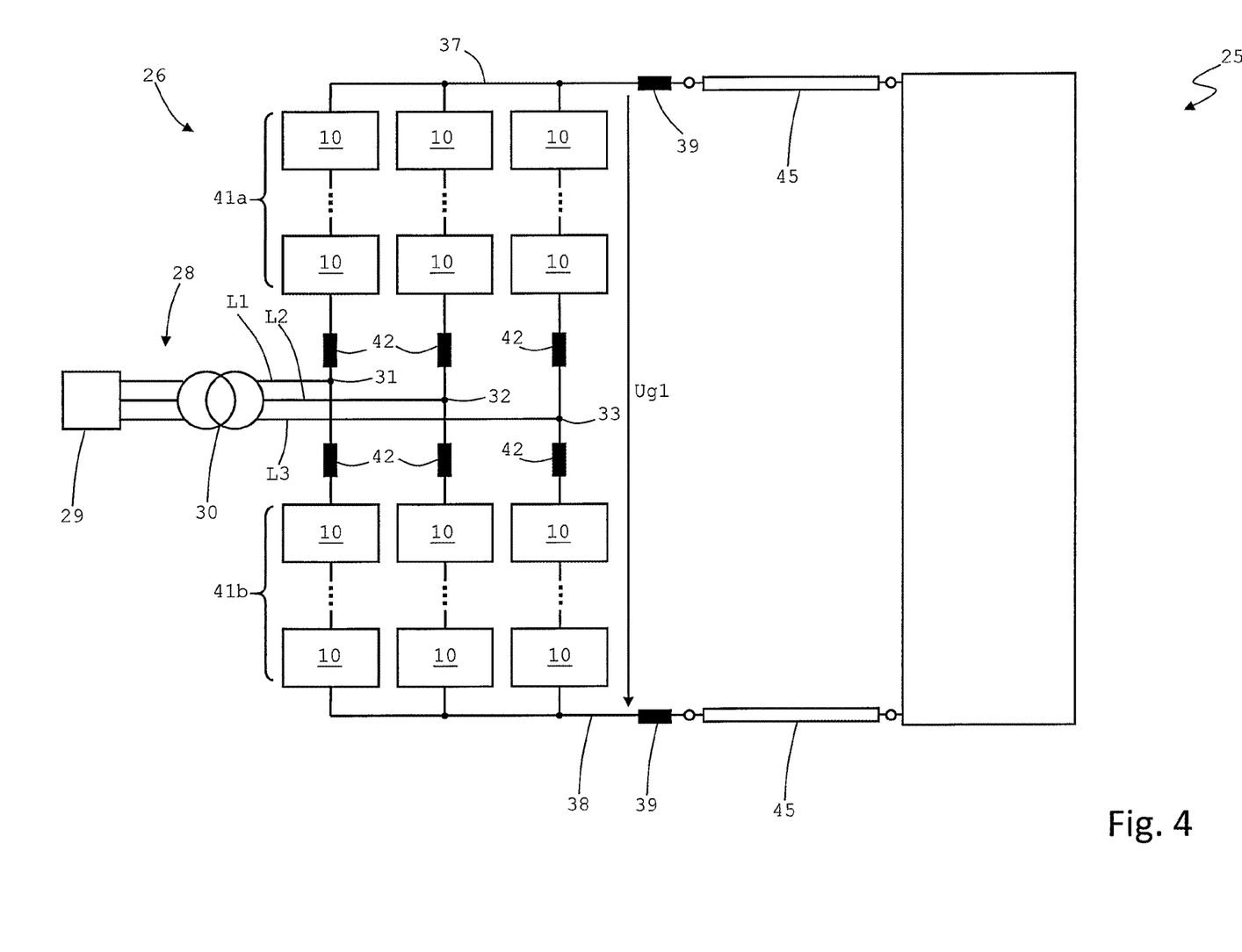

With the embodiment of the converter 25 shown in FIG. 4, the first switch module arrangement 26 with both direct voltage connections 37, 38 and the respective first inductance 39 are connected to an electrical cable 45. The cable 45 can be connected again either through a second switch module arrangement 26 to an external unit 28 operated with alternating voltage or alternatively to a unit working with the direct voltage. The application possibilities of the switch module 10 and that of the converter 25 are multifarious.

Figure 5:
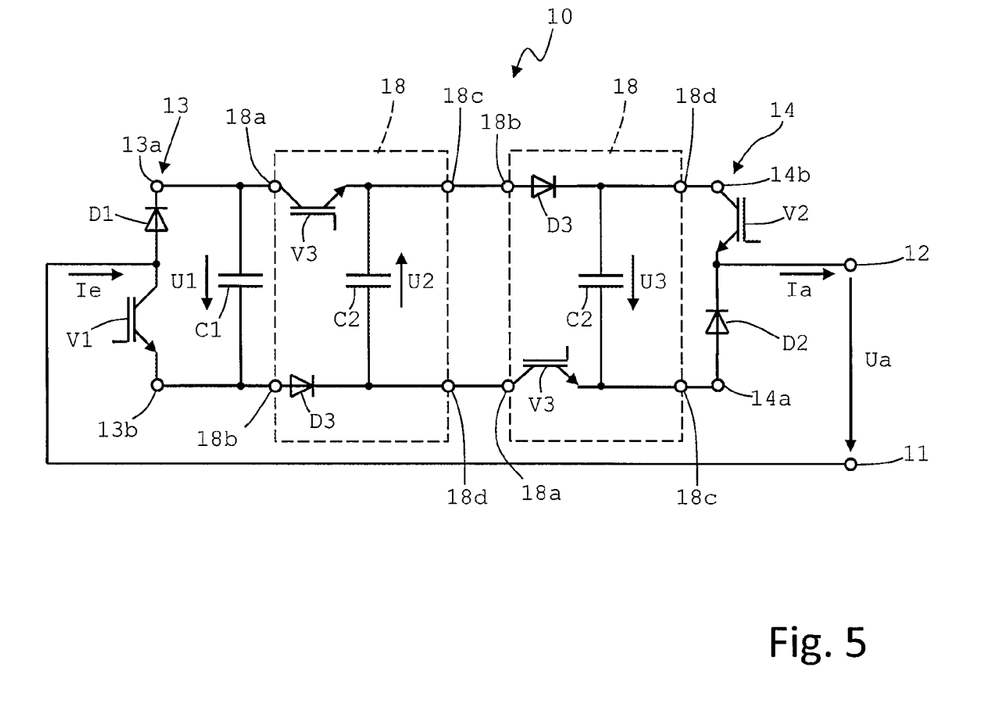
FIG. 5 shows a block diagram of another embodiment of a switch module in accordance with the present invention and FIG. 6 shows a block diagram shows the principal arrangement of a series connection of multiple intermediate circuits of a switch module.

In FIG. 5, a modified embodiment of the switch module 10 is shown, which presents more than one intermediate circuit 18. The two intermediate circuits 18 are shown there only by way of example, which are connected in series. Depending on the number of intermediate circuits the number of different voltage levels can be set for the output voltage.

Through the additional intermediate circuit 18, as a whole, three capacitors and four power semi-conductor switches are present. With the help of this embodiment seven different voltage levels can be set for the output voltage Ua. For each intermediate circuit 18 connected additionally in series the number of the adjustable voltage level for the output voltage Ua increases by two.

The intermediate circuits 18 are, based on the first series connection 13, connected in series in such a way that the first output connection 18C of the intermediate circuit 18 connected with the first series connection 13 is connected with the second input connection 18B of the intermediate connection 13 connected to it. Similarly, the second output connection 18D of the intermediate circuit 18 connected with the first input connection 18A of the intermediate connection 18. The diode and the power semi-conductor switch thereby, so to say, exchange their places in the intermediate circuits 18 connected in series and the respective capacitor voltage changes its polarity (in FIG. 5, the third power semi-conductor switch V3 and the third diode D3 are arranged once above and once below). This continues correspondingly if, for instance, three or more intermediate circuits 18 are connected in series (FIG. 6).

Figure 6:
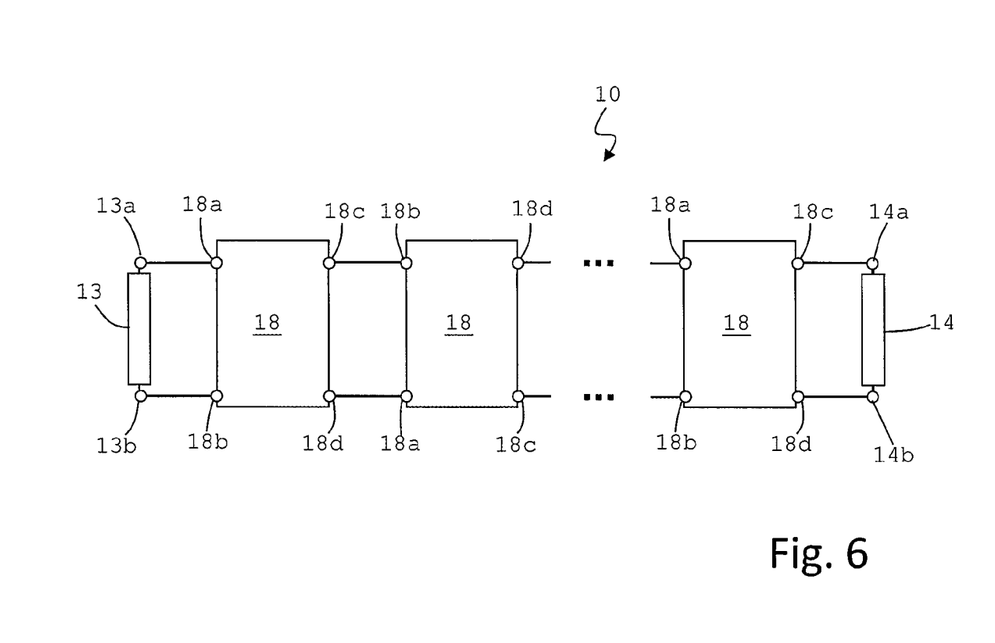

As in FIG. 6, it is to be recognized that the intermediate circuit 18 connected with the first series connection 13 is always connected to the first input connection 18a with the diode-side first connection node 13A and the second input connection 18B is always connected with the switch-side second connection node 13B. With the intermediate circuit 18 connected with the second series connection 14 the first output connection 18C is always connected with the diode-side third connection node 14A and the second output connection 18D with the switch-side fourth connection node 14B.

Embodiments of the present invention relate to a switch module 10 and a converter 25 developed with the aid of the switch module 10. The switch module 10 presents two series connections 13, 14 comprising a power semi-conductor switch V1 and V2 respectively and a diode D1 and D2 respectively. Parallel to the first series connection 13 a first capacitor C1 is connected. Between the first capacitor C1 and the second series connection 14 at least one intermediate switch 18 is connected. This is designed as quadripole, whereby between both the output connections 18C, 18D a second capacitor is connected. The first output connection 18C is connected through a third power semi-conductor switch V3 with the first input connection 18A. The second output connection 18D is connected with the cathode of a third diode D3, whose anode is connected with the second input connection 18B of the second intermediate circuit 18. With this switch module 10 at least five voltage levels can be adjusted for an output voltage Ua. For each additionally present intermediate circuit the number of possible voltage level increases by 2.

What is claimed is:

1. A switch module for a converter, the switch module comprising: a first power-semiconductor switch (V1), a second semi-conductor switch (V2), a third semi-conductor switch (V3), a first diode (D1), a second diode (D2), and a third diode (D3), all connected in a closed series, wherein: a collector of the first power-semiconductor switch (V1) is directly connected with an anode of the first diode (D1), a cathode of the first diode (D1) is directly connected with a collector of the third semi-conductor switch (V3), a current emitting connection (emitter) of the third semi-conductor switch (V3) is directly connected with an anode of the second diode (D2), a cathode of the second diode (D2) is directly connected with an emitter of the second power-semiconductor switch (V2), a collector of the second power-semiconductor switch (V2) is directly connected with a cathode of the third diode (D3), and an anode of the third diode (D3) is directly connected an emitter of the first power-semiconductor switch (V1);
   a first capacitor (C1) with a first end directly connected to a first node at an in-between point along the direct connection between the cathode of the first diode (D1) and the collector of the third power-semiconductor switch (V3), and a second end directly connected to a second node at an in-between point along the direct connection between the emitter of the first power-semiconductor switch (V1) and the anode of the third diode (D3);
   a second capacitor (C2) with a first end directly connected to a third node at an in-between point along the direct connection between the emitter of the third power-semiconductor switch (V3) and the anode of the second diode (D2), and a second end directly connected to a fourth node at an in-between point along the direct connection between the cathode of the third diode (D3) and the collector of the second power-semiconductor switch (V2);
   a first module connection (11) directly connected to a fifth node at an in-between point along the direct connection between the collector of the first power-semiconductor switch (V1) and the anode of the first diode (D1); and
   a second module connection (12) directly connected to a sixth node at an in-between point along the direct connection between the cathode of the second diode (D2) and the emitter of the second power-semiconductor switch (V2); wherein only the three power semi-conductor switches (V1, V2, V3) are present and only the three diodes (D1, D2, D3) are present in the switch module;
   wherein the switch module is configured to regulate an output voltage (Ua) of the switch module between the first module connection (11) and the second module connection (12) according to a first switch status of the first power-semiconductor switch (V1), a second switch status of the second power-semiconductor switch (V2), and a third switch status of the third power-semiconductor switch (V3), each power-semiconductor switch being configurable for a switch status of a conducting status and a blocking status.

2. The switch module of claim 1, wherein the output voltage (Ua) is further determined by a first input voltage (U1) established across the first capacitor (C1) and a second input voltage (U2) established across the second capacitor (C2).

3. The switch module of claim 2, further comprising:
   a first input connection (18a) and a second input connection (18b) for establishing the first input voltage (U1) across the first capacitor (C1), and
   a third input connection (18c) and a fourth input connection (18d) for establishing the second input voltage (U2) across the first capacitor (C1).

4. The switch module of claim 2, wherein the output voltage (Ua) is determined as one of seven values by the first switch status, the second switch status, the third switch status, the first input voltage (U1) and the second input voltage (U2) according to the following table:

| Switch status for switch Vn: | | | |
| --- | --- | --- | --- |
| V1 | V2 | V3 | Output Voltage (Ua) |
| conducting | conducting | blocking | 0 |
| blocking | blocking | conducting | |
| blocking | conducting | blocking | −U1 |
| conducting | blocking | blocking | −U2 |
| conducting | blocking | conducting | U1 |
| blocking | conducting | conducting | U2 |
| blocking | Blocking | blocking | −U1 − U2 |
| conducting | Conducting | conducting | U1 + U2. |

5. The switch module of claim 1, wherein each of the power semiconductor switches (V1, V2, V3) is a semiconductor switch.

6. The switch module of claim 1, wherein the switch module is configured to conduct a current unidirectionally from first module connection (11) to the second module connection (12).

7. A converter with at least one switch module arrangement, presents a phase connection for each connectable electrical phase of an external unit and a first direct voltage connection and a second direct voltage connection, between which a direct voltage of the converter abuts,
- wherein the switch module arrangement presents at least one module series connection with at least two switch modules in accordance with claim 1,
- wherein the at least one module series connection is connected between the first direct voltage connection and the second direct voltage connection, and
- wherein each available phase connection is connected with a middle connection of a module series connection.

8. The converter in accordance with claim 7 wherein:
- the phase connection is arranged at the connection between two adjacent switch modules of the respective module series connection and that between the phase connection and both the first and the second direct voltage connections the same number of switch modules is connected.

9. The converter in accordance with claim 7, wherein the two switch module arrangements are present, whose the first direct voltage connections and the second direct voltage connections are respectively indirectly or directly connected with each other.

* * * * *